(12) United States Patent
Chen et al.

(10) Patent No.: US 12,384,025 B2
(45) Date of Patent: Aug. 12, 2025

(54) ROBOT CONTROL METHOD AND DEVICE BASED ON PHYSICAL ENGINE, AND REHABILITATION ROBOT

(71) Applicant: SHANGHAI FOURIER INTELLIGENCE CO., LTD, Shanghai (CN)

(72) Inventors: Xin Chen, Shanghai (CN); Jie Gu, Shanghai (CN); Jianzhong Shen, Shanghai (CN); Li Ding, Shanghai (CN)

(73) Assignee: SHANGHAI FOURIER INTELLIGENCE CO., LTD, Shanghai (CN)

( * ) Notice: Subject to any disclaimer, the term of this patent is extended or adjusted under 35 U.S.C. 154(b) by 191 days.

(21) Appl. No.: 18/326,943

(22) Filed: May 31, 2023

(65) Prior Publication Data

US 2023/0321819 A1    Oct. 12, 2023

Related U.S. Application Data

(63) Continuation of application No. PCT/CN2022/114509, filed on Aug. 24, 2022.

(30) Foreign Application Priority Data

Sep. 30, 2021  (CN) .......................... 202111163733.3

(51) Int. Cl.
*B25J 9/16*  (2006.01)
*A61H 1/02*  (2006.01)
*G06F 3/01*  (2006.01)

(52) U.S. Cl.
CPC ........... *B25J 9/1605* (2013.01); *B25J 9/1633* (2013.01); *B25J 9/1664* (2013.01)

(58) Field of Classification Search
CPC ...... B25J 9/1605; B25J 9/1633; B25J 9/1664; B25J 9/1661; B25J 9/161; B25J 9/00;
(Continued)

(56) References Cited

U.S. PATENT DOCUMENTS 6,028,593 A * 2/2000 Rosenberg ............. B25J 9/1689
463/37
10,675,766 B1 * 6/2020 Niemeyer ............. B25J 13/025
(Continued)

FOREIGN PATENT DOCUMENTS

| CN | 104793622 A | 7/2015 |
|---|---|---|
| CN | 114434438 A | 5/2022 |
| CN | 115319762 A | 11/2022 |

*Primary Examiner* — Adam R Mott
*Assistant Examiner* — Byron Xavier Kasper
(74) *Attorney, Agent, or Firm* — HAUPTMAN HAM, LLP

(57) ABSTRACT

The present application relates to the technical field of robots, and discloses a robot control method based on a physical engine. The method includes: obtaining the current first resultant force to which a robot is subjected and the current second resultant force to which a virtual object in a virtual environment constructed by a physical engine is subjected; determining the current motion information corresponding to the current first resultant force and the current second resultant force according to the corresponding relationship between the force and the motion information; wherein the current second resultant force is determined by the physical engine according to the previous motion information corresponding to the previous first resultant force of the robot and the previous second resultant force of the virtual object, and the current motion information enables the current first resultant force and the current second resultant force to tend to be synchronized.

9 Claims, 4 Drawing Sheets

(58) Field of Classification Search
CPC . B25J 9/16; B25J 9/1602; B25J 9/1653; B25J 9/1671; B25J 9/1694; B25J 13/025; B25J 13/081; B25J 13/084; G06F 3/016; Y02P 90/02; A61H 1/0237; A61H 1/0274; A61H 2201/1207; A61H 2201/1659; A61H 2201/50; A61H 2205/06; A61H 2205/10; A61B 2018/00297; A61B 5/7455; A61B 34/76; A61B 2019/2292; G05B 2219/40122; G05B 2219/40619
See application file for complete search history.

(56) References Cited

U.S. PATENT DOCUMENTS

| | | | |
|---|---|---|---|
| 2020/0179212 A1* | 6/2020 | Wilkinson | A61H 1/0285 |
| 2021/0283785 A1* | 9/2021 | Chen | B25J 9/1697 |
| 2022/0009095 A1* | 1/2022 | Huang | B25J 9/1607 |
| 2022/0388171 A1* | 12/2022 | Kelch | B25J 13/085 |
| 2023/0047834 A1* | 2/2023 | Mao | B25J 9/1669 |
| 2023/0100222 A1* | 3/2023 | Ben Shmuel | B24B 49/04 |
| | | | 125/30.01 |
| 2023/0256605 A1* | 8/2023 | Ning | B25J 9/1651 |
| | | | 700/255 |

* cited by examiner

ROBOT CONTROL METHOD AND DEVICE BASED ON PHYSICAL ENGINE, AND REHABILITATION ROBOT

CROSS-REFERENCE TO RELATED APPLICATIONS

The application claims priority to Chinese patent application No. 202111163733.3, filed on Sep. 30, 2021, the entire contents of which are incorporated herein by reference.

TECHNICAL FIELD

The present application relates to the technical field of robots, for example to a robot control method and device based on a physical engine, and a rehabilitation robot

BACKGROUND

A physical engine performs calculations on motion, rotation, and collision reactions by assigning real physical properties to a rigid object. The physical engine can simulate the motion state of a virtual object in a variety of virtual environments. After combining the physical engine with the robot, the stress state, motion state, etc. of the virtual object in the virtual environment can be fed back to a user through a robot, so that the user can obtain a more realistic tactile experience. The solution can be applied to the scenes such as limb training and rehabilitation training.

In order to feed back the stress state, motion state, etc. of a virtual object in a virtual environment to a user via a robot, the motion information about the robot can be sent to a physical engine, the motion information about the robot is physically mapped as the motion information about the virtual object in the virtual environment, the stress circumstances of the virtual object is determined based on the motion information about the virtual object and a configuration parameter of the virtual environment, and then the robot is controlled according to the stress circumstances of the virtual object; or the motion information about the virtual object in the virtual environment is determined based on the stress circumstances of the virtual object, and then the robot motion is controlled according to the motion information about the virtual object so as to enable the user to obtain a tactile experience in the virtual environment and improve the user's usage experience.

In implementing the embodiments of the present application, it has been found that the related art has at least the following problems that in the process of controlling the motion of the robot according to the stress circumstances of the virtual object, or controlling the motion of the robot according to the motion information of the virtual object, the virtual environment simulated by the physical engine has a certain complexity. If the stress or motion state of the virtual object changes suddenly in the virtual environment, the stress or motion state of the robot will change suddenly, resulting in a certain impact of the robot on the user, which is not conducive to user safety.

SUMMARY

In order to provide a basic understanding of some aspects of the disclosed embodiments, a brief summary is given below. This summary is not a general comment, nor is it intended to determine key/important constituting elements or describe the scope of these embodiments, but serves as a preface to the detailed description that follows.

The embodiments of the present application provide a robot control method and device based on a physical engine, and a rehabilitation robot, so as to solve the technical problem that the solution of controlling a robot according to a virtual object simulated by a physical engine in the prior art is not conducive to user safety.

In some embodiments, a robot control method based on a physical engine includes:
  obtaining a current first resultant force to which a robot is subjected and a current second resultant force to which a virtual object in a virtual environment constructed by a physical engine is subjected;
  determining current motion information corresponding to the current first resultant force and the current second resultant force according to a corresponding relationship between a force and motion information; wherein the current second resultant force is determined by the physical engine according to previous motion information corresponding to a previous first resultant force of the robot and a previous second resultant force of the virtual object, and the current motion information enables the current first resultant force and the current second resultant force to tend to be synchronized;
  feeding back the current motion information to the physical engine, so that the physical engine controls the motion of the virtual object according to the current motion information; and
  feeding back the current motion information to the robot and controlling the motion of the robot according to the current motion information.

Alternatively, the corresponding relationship between the force and the motion information comprises:

$$F = M\ddot{x} + B\dot{x} + Kx$$

where F is a difference value between a first resultant force and a second resultant force, x is a position corresponding to the motion information; $\dot{x}$ is a speed corresponding to the motion information; $\ddot{x}$ is an acceleration corresponding to the motion information, M corresponds to an inertia parameter difference value between a real inertia parameter of the robot and a virtual inertia parameter of the virtual object, B corresponds to a damping parameter difference value between a real damping parameter of the robot and a virtual damping parameter of the virtual object, and K is a compensation coefficient for achieving position synchronization between the robot and the virtual object.

Alternatively, virtual object motion is controlled according to the current motion information, and the motion of the robot is controlled according to the current motion information, comprising:
  obtaining a current first position of the robot, and a current second position of the virtual object in the virtual environment; determining a sum of the current first position and a position corresponding to the current motion information as the first expected position of the robot and making the current first position follow the first expected position; and determining a difference between the current second position and the position corresponding to the current motion information as a second expected position of the virtual object, and making the current second position follow the second expected position.

Alternatively, virtual object motion is controlled according to the current motion information, and the motion of the robot is controlled according to the current motion information, comprising:

obtaining the current first position of the robot, and the current second position of the virtual object in the virtual environment; determining the difference between the current first position and the position corresponding to the current motion information as the first expected position of the robot and making the current first position follow the first expected position; and determining the sum of the current second position and the position corresponding to the current motion information as the second expected position of the virtual object, and making the current second position follow the second expected position.

Alternatively, virtual object motion is controlled according to the current motion information, and the motion of the robot is controlled according to the current motion information, comprising:

obtaining a current first speed of the robot, and a current second speed of the virtual object in the virtual environment; determining a speed corresponding to the current motion information as the first expected speed of the robot and making the current first speed follow the first expected speed; and determining the speed corresponding to the current motion information as a second expected speed of the virtual object, and making the current second speed follow the second expected speed.

Alternatively, virtual object motion is controlled according to the current motion information, and the motion of the robot is controlled according to the current motion information, comprising:

obtaining the current first speed of the robot, and the current second speed of the virtual object in the virtual environment; determining a sum/difference between the speed corresponding to the current motion information and the current first speed as the first expected speed of the robot, and making the current first speed follow the first expected speed; and determining the difference/sum of the speed corresponding to the current motion information and the current second speed as the second expected speed of the virtual object and making the current second speed follow the second expected speed.

Alternatively, the parameter M is determined in the following manner: obtaining the inertial parameter difference value between the real inertial parameter of the robot and the virtual inertial parameter of the virtual object, and determining the inertial parameter difference value as the parameter M; or obtaining an inertial adjustment parameter positively related to Kx item, and determining a sum of the inertial parameter difference value and the inertial adjustment parameter as the parameter M; or determining a product of the inertial parameter difference value and the inertial adjustment parameter as the parameter M.

Alternatively, the parameter B is determined in the following manner: obtaining the damping parameter difference value between the real damping parameter of the robot and the virtual damping parameter of the virtual object, and determining the damping parameter difference value as the parameter B; or obtaining a damping adjustment parameter positively related to Kx item, and determining the sum of the damping parameter difference value and the damping adjustment parameter as the parameter B; or determining the product of the damping parameter difference value and the damping adjustment parameter as the parameter B.

Alternatively, the parameter K is determined in the following manner: obtaining a parameter K that is positively related to the difference value F.

Alternatively, the physical engine determines the current second resultant force according to the previous motion information corresponding to the previous first resultant force and the previous second resultant force, comprising: determining a previous virtual driving force of the virtual object according to the previous motion information; obtaining configuration information about a virtual environment; determining a previous virtual environment acting force of the virtual object in the virtual environment according to the previous second motion information and configuration information about the virtual object in the virtual environment; and determining the resultant force of the previous virtual driving force and the previous virtual environment acting force as the current second resultant force.

In some embodiments, a robot control device based on a physical engine includes an obtaining module, a determination module, a first control module, and a second control module. The obtaining module is configured to obtain a current first resultant force to which a robot is subjected and a current second resultant force to which a virtual object in a virtual environment constructed by the physical engine is subjected; the determination module is configured to determine current motion information corresponding to the current first resultant force and the current second resultant force according to a corresponding relationship between a force and motion information; wherein the current second resultant force is determined by the physical engine according to previous motion information corresponding to a previous first resultant force of the robot and a previous second resultant force of the virtual object and the current motion information enables the current first resultant force and the current second resultant force to tend to be synchronized; the first control module is configured to feed back the current motion information to the physical engine so that the physical engine controls a motion of the virtual object according to the current motion information; and the second control module is configured to feed back the current motion information to the robot and control the motion of the robot according to the current motion information.

In some embodiments, a robot control device based on a physical engine includes a processor and a memory storing a program instruction, the processor being configured to execute the robot control method based on a physical engine provided by the foregoing embodiment when executing the program instruction.

In some embodiments, a rehabilitation robot includes the robot control device based on a physical engine provided in the foregoing embodiments.

The robot control method and device based on a physical engine, and the rehabilitation robot provided by the embodiments of the present application can achieve the following technical effects:

the current second resultant force of the virtual object is determined by the physical engine according to the previous motion information corresponding to the previous first resultant force of the robot and the previous second resultant force of the virtual object; the current motion information is determined according to the current first resultant force of the robot and the current second resultant force of the virtual object; the current motion information is fed back to the robot and the physical engine so that the robot moves according to the current motion information and the virtual object moves according to the current motion information; in the above-mentioned control process, the transmission sequence of the force and the motion information constitutes one closed loop. According to such a force and motion information transmission sequence, after the sudden change of the virtual environment acting force on the virtual object, the current second resultant force suddenly changes; the current motion information determined according to the current first resultant force and the current second resultant force has the function of synchronously applying a force to the robot and the virtual object, so that after the current second resultant force suddenly changes; in order to synchronously apply a force to the robot and the virtual object, the current motion information may not suddenly change, so that the motion state of the robot may not suddenly change, thereby reducing the impact of the robot on the user, which is beneficial to improving the user safety.

The foregoing general description and the following description are exemplary and explanatory only and are not restrictive of the application.

BRIEF DESCRIPTION OF DRAWINGS

One or more than one embodiment is exemplified by the accompanying drawings corresponding thereto. These exemplified descriptions and drawings do not constitute a limitation on the embodiments. Elements in the drawings having the same reference number designation are deemed as similar elements, wherein.

DETAILED DESCRIPTION OF THE EMBODIMENTS

Figure 1:
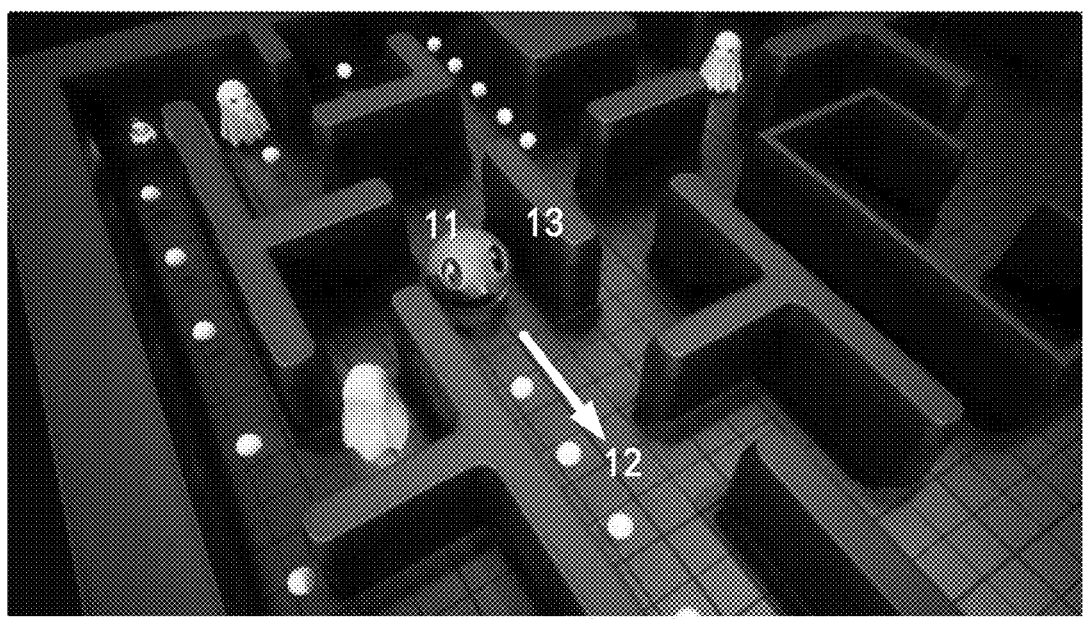
FIG. 1 is a schematic diagram of a virtual environment and virtual object provided in an embodiment of the present application.

In order to provide a more detailed understanding of the features and technical content of the embodiments of the present application, the implementation of the embodiments of the present application will be described in detail below with reference to the accompanying drawings. The attached drawings are for reference only and are not used to limit the embodiments of the present application. In the following technical description, for the convenience of explanation, a number of details are used to provide a sufficient understanding of the disclosed embodiments. However, one or more than one embodiments may still be implemented without these details. In other instances, well-known structures and apparatuses may be shown in simplified form in order to simplify the drawing.

The terms "first", "second", and the like in the description of the embodiments of the present application, in the claims, and in the accompanying drawings are used for distinguishing between similar objects and not necessarily for describing a particular sequential or chronological order. It should be understood that the data so used are interchangeable under appropriate circumstances for the embodiments of the application described herein. Furthermore, the terms "comprises" and "has", as well as any variations thereof, are intended to cover a non-exclusive inclusion.

Unless otherwise stated, the term "multiple" means two or more.

In the embodiments of the present application, the character "l" indicates that the objects before and after are of a "or" relationship. For example, A/B represents: A or B.

The physical engine can be seen as a set of a series of operational rules, each of which conforms to Newton's three laws. By assigning real physical properties to a rigid object to calculate motions, rotations and collision reactions, the physical engine can simulate therein the rules of motions and interactions of various objects in the real world. A virtual environment is previously constructed in the physical engine, and a virtual object is constructed in the virtual environment. The physical engine can be Havok, NovodeX, Bullet, ODE, TOKMAK, Newton, Simple Physics Engine, etc. However, the above list is merely illustrative of the physical engine, and other physical engines in the prior art besides those listed above are also applicable to the present application.

The physical engine can simulate a virtual environment of multiple scenes, the configuration parameters of different virtual environments are different, and the configuration parameters are used for determining the properties of each object in the virtual environment, including: physical properties, material properties, geometric properties, and connection relationships between objects of objects in the virtual environment. The physical properties represent properties such as mass, position, rotational angle, speed and damping of an object in a virtual environment; a material property represents a material property of an object in a virtual environment, for example, a density, friction coefficient, a recovery coefficient, etc.; the geometric property represents the geometric shape of an object in a virtual environment; connection relationships between objects represent the associations between objects in a virtual environment.

After simulating the virtual environment and the virtual object, the physical engine can calculate a virtual environment acting force of the virtual environment on the virtual object. According to the nature of the force, the virtual environment acting force can comprise: virtual gravity, virtual gravitational force, virtual elastic force, virtual frictional force, virtual molecular force, virtual electromagnetic force, virtual nuclear force, etc.; according to the effect of the force, the virtual environment forces may include: virtual tensile force, virtual tension, virtual pressure, virtual support force, virtual resistance force, virtual centripetal force, virtual restoring force, etc.; according to the effect of the force, the virtual environment acting force may include: virtual contact force and virtual non-contact force; according to the force interaction, the virtual environment acting force may include: virtual stress interacting force, virtual electromagnetic interacting force, virtual strong interacting force, and virtual weak interacting force.

Depending on specifically different virtual environments, the virtual environment acting force in this application can be the combined force of any one or more of the aforementioned forces The virtual object moves passively under the action of the virtual environment acting force, and correspondingly, the virtual object moves actively under the action of the virtual driving force. In the virtual scene as shown in FIG. 1, the virtual ground is horizontal ground, the force that drives the virtual object 11 to move in the arrow direction 12 as shown is a virtual driving force, and the frictional force that the virtual ground exerts on the virtual object 11 is a virtual environment acting force. (In the scene where the virtual object 1 collides with the obstacle 13, the force exerted by the obstacle 13 on the virtual object 11 is also a virtual environment acting force, and the collision scene is not shown in the figure)

Figure 2:
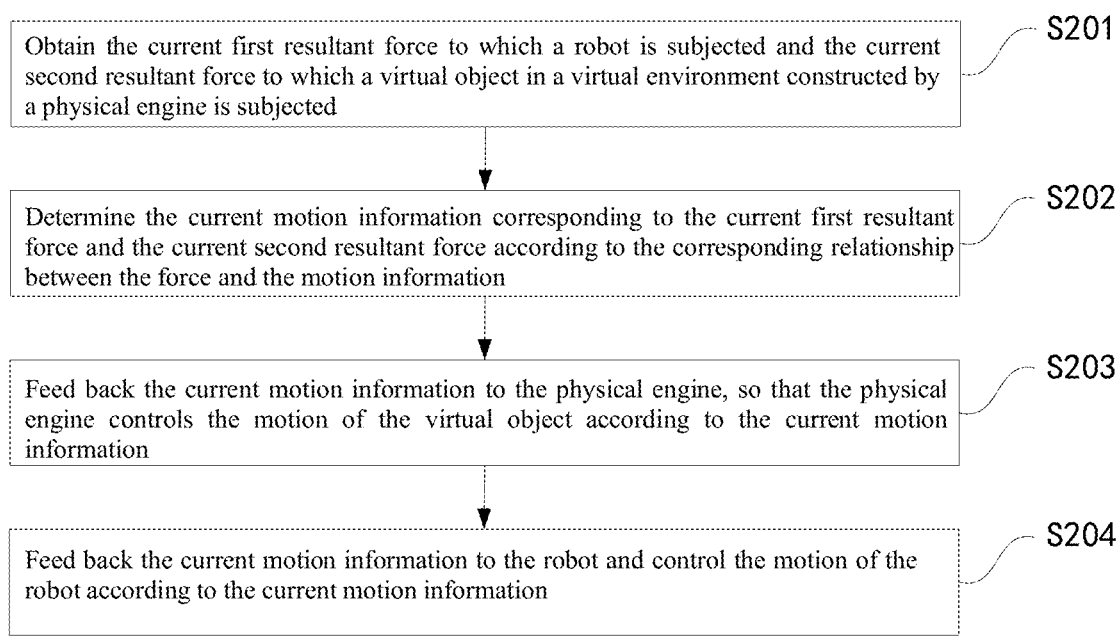
FIG. 2 is a schematic diagram of a robot control method based on a physical engine provided in an embodiment of the present application.

FIG. 2 is a schematic diagram of a robot control method based on a physical engine provided in the embodiment of the present application.

As shown in conjunction with FIG. 2, a robot control method based on a physical engine comprises steps as follows.

S201, obtain a current first resultant force to which the robot is subjected and a current second resultant force to which the virtual object in the virtual environment constructed by the physical engine is subjected.

The current first resultant force experienced by the robot here refers to the resultant force experienced by the end of the robot at the current moment. In a specific application, the present first resultant force may be a driving force of the robot, may be a resultant force of a driving force and a frictional force of the robot, and may be a resultant force of a driving force, a frictional force of the robot, and an acting force (which may be obtained by means of a force sensor arranged at the robot) applied by the user to the robot.

In the case where the end of the robot is movable in a plane, the current first resultant force of the robot may be represented by a coordinate/vector in a plane coordinate system; where the end of the robot is movable in a three-dimensional space, the current first resultant force of the robot may be represented by coordinates/vectors of a three-dimensional coordinate system.

The current second resultant force experienced by the virtual object in the virtual environment refers to the resultant force experienced by the virtual object in the virtual environment at the current moment. In a specific application, the current second resultant force may be a virtual environment acting force and may be a resultant force of a virtual environment acting force and a virtual driving force.

In the case where the virtual object can move in a plane, the current second resultant force of the virtual object can be represented by a coordinate/vector in a plane coordinate system; in the case where the virtual object is movable in a three-dimensional space, the current second resultant force of the virtual object may be represented by coordinates/vectors of a three-dimensional coordinate system.

The coordinate system where the robot is located and the coordinate system where the virtual object is located have a mapping relationship, and the above-mentioned current first resultant force and current second resultant force refer to two resultant forces which have been mapped into the same coordinate system. In addition, other parameters in the present application, such as: the current motion information, the previous first resultant force, the previous second resultant force, the virtual environment acting force, the force applied by the user, the current first position, the current second position, the first expected position, the second expected position, the current first speed, the current second speed, the first expected speed, the second expected speed, the current first motion information, the current second motion information, etc. are all parameters mapped to the same coordinate system.

S202, determine the current motion information corresponding to the current first resultant force and the current second resultant force according to the corresponding relationship between the force and the motion information; wherein the current second resultant force is determined by the physical engine according to previous motion information corresponding to the previous first resultant force of the robot and the previous second resultant force of the virtual object.

The motion information in the present application may be one or more of acceleration, speed, and position. In the present application, the acceleration generally refers to linear acceleration and angular acceleration, the speed generally refers to linear speed and angular speed, and the position generally refers to a spatial position and angle. Here, the motion information includes two cases: the acceleration is linear acceleration, the speed is linear, and the position is a spatial position; the acceleration is angular acceleration, the speed is angular speed, and the position is an angle.

The corresponding relationship between the force and the motion information can be determined by way of a limited number of trials, for example, the case where the robot moves under one first resultant force, the virtual object moves under one second resultant force, there is a difference value between one first resultant force and one second resultant force, a piece of motion information is determined by way of a limited number of trials, and the motion information is fed back to the robot and the physical engine; there is a tendency to synchronize one first resultant force and one second resultant force, namely, there is an effect of reducing the difference value between one first resultant force and one second resultant force; after controlling the movement of the robot according to the one piece of motion information, the impact of the robot on the user is within the user bearing range; if the one piece of motion information satisfies the above-mentioned condition, it is determined that there is a corresponding relationship among the one first resultant force, the one second resultant force, and the one piece of motion information. After the corresponding relationship between the force and the motion information is determined, the corresponding relationship between the force and the motion information may be stored in a database in the form of a corresponding data table; after the current first resultant force and the current second resultant force are obtained, the current motion information corresponding to the current first resultant force and the current second resultant force can be obtained by querying the database.

Or the corresponding relationship between the force and the motion information is embodied in the form of a formula. For example, the corresponding relationship between the force and the motion information comprises:

$$F = M\ddot{x} + B\dot{x} + Kx$$

where F is the difference value between the first resultant force and the second resultant force, can be obtained by subtracting the second resultant force from the first resultant force, and can also be obtained by subtracting the first resultant force from the second resultant force; $x$ is a position corresponding to the motion information; $\dot{x}$ is a speed corresponding to the motion information; $\ddot{x}$ is an acceleration corresponding to the motion information, M corresponds to an inertia parameter difference value between a real inertia parameter of the robot and a virtual inertia parameter of the virtual object, B corresponds to a damping parameter difference value between a real damping parameter of the robot and a virtual damping parameter of the virtual object, and K is a compensation coefficient for achieving position synchronization between the robot and the virtual object.

The above-mentioned corresponding relationship between the force and the motion information in the form of a formula can be stored in a storage medium, and after the current first resultant force and the current second resultant force are obtained, the current motion information corresponding to the current first resultant force and the current second resultant force can be calculated according to the above-mentioned corresponding relationship in the form of a formula.

In addition, by using the above-mentioned corresponding relationship between the force and the motion information, the difference value of the inertia parameter between the real inertia parameter of the robot and the virtual inertia parameter of the virtual object can be compensated, and the difference value of the damping parameter between the real damping parameter of the robot and the virtual damping parameter of the virtual object can be compensated, so that the motion state and stress state of the robot and the virtual object can be more synchronized on the basis of reducing the impact of the robot on the user, which is beneficial to improving the user's usage experience.

Alternatively, the parameter M is determined in the following manner: obtaining an inertia parameter difference value between the real inertia parameter of the robot and the virtual inertia parameter of the virtual object, and determining the inertia parameter difference value as a parameter M.

The real inertial parameter of the robot can be calculated based on a structural parameter of the robot or can be obtained by trials.

In some specific applications, the above parameter M can also be determined directly by trials.

Still further, the parameter M may be determined in the following manner: obtaining the inertial parameter difference value between the real inertial parameter of the robot and the virtual inertial parameter of the virtual object, obtaining an inertial adjustment parameter positively related to the Kx item, determining the sum of the inertial parameter difference value and the inertial adjustment parameter as the parameter M, or determining the product of the inertial parameter difference value and the inertial adjustment parameter as the parameter M.

When there is a difference value between the current first resultant force and the current second resultant force, the current first position of the robot and the current second position of the virtual object are easy to have positional difference value. After the position corresponding to the current motion information is fed back to the robot and the virtual object, it not only has the function of synchronizing the current first resultant force and the current second resultant force, but also enables the current first position of the robot and the current second position of the virtual object to tend to synchronize.

Specifically, the Kx item enables a restoring force to be generated between the robot and the virtual object, so as to promote the synchronization of the positions of the robot and the virtual object, thereby providing the effect of eliminating the position difference value; the greater the position difference value is, the greater the restoring force represented by the Kx item is, and this will cause the robot and the virtual object to arrive at the same position at a fast speed. On the one hand, it will cause the robot to have a great impact on the user, and on the other hand, it will cause both the robot and the virtual object to synchronize to the same position at a fast speed, and will cause both the robot and the virtual object to separate again under the action of their respective inertia or under the action of a collision, and finally, will cause the robot and the virtual object to generate shaking.

With the above-mentioned technical solution, when the Kx item increases, the inertia parameter increases thereupon, so as to decrease the growth speed of the Kx item with the increase of the position in the current motion information, which is beneficial to reduce the synchronization speed of the robot and the virtual object synchronizing to the same position. On the one hand, it reduces the impact of the robot on the user, and on the other hand, it may also reduce the shaking of the robot.

Alternatively, the parameter B is determined in the following manner: obtaining a damping parameter difference value between the real damping parameter of the robot and the virtual damping parameter of the virtual object, and determining the damping parameter difference value as the parameter B. The real damping parameter of the robot can be calculated from the material properties of the robot, etc., or can be obtained by trials.

In some specific applications, the above parameter B may also be determined directly by trials.

Still further, a damping parameter difference value of the real damping parameter of the robot and the virtual damping parameter of the virtual object is obtained, a damping adjustment parameter positively related to the Kx item is obtained, and the sum of the damping parameter difference value and the damping adjustment parameter is determined as the parameter B, or the product of the damping parameter difference value and the damping adjustment parameter is determined as the parameter B.

When there is a difference value between the current first resultant force and the current second resultant force, the current first position of the robot and the current second position of the virtual object are easy to have positional difference value. After the position corresponding to the current motion information is fed back to the robot and the virtual object, it not only has the function of synchronizing the current first resultant force and the current second resultant force, but also enables the current first position of the robot and the current second position of the virtual object to tend to synchronize.

Specifically, the Kx item enables a restoring force to be generated between the robot and the virtual object, so as to promote the synchronization of the positions of the robot and the virtual object, thereby providing the effect of eliminating the position difference value; the greater the position difference value is, the greater the restoring force represented by the Kx item is, and this will cause the robot and the virtual object to arrive at the same position at a fast speed. On the one hand, it will cause the robot to have a great impact on the user, and on the other hand, it will cause both the robot and the virtual object to synchronize to the same position at a fast speed, and will cause both the robot and the virtual object to separate again under the action of their respective inertia or under the action of a collision, and finally, will cause the robot and the virtual object to generate shaking.

With the above-mentioned technical solution, when the Kx item increases, the damping parameter increases thereupon, so as to decrease the growth speed of the Kx item with the increase of the position in the current motion information, which is beneficial to reduce the synchronization speed of the robot and the virtual object synchronizing to the same position. On the one hand, it reduces the impact of the robot on the user, and on the other hand, it may also reduce the shaking of the robot.

Alternatively, the parameter K is determined in the following manner: obtaining a parameter K that is positively related to the difference value F.

The smaller the above-mentioned parameter K is, the easier the robot and the virtual object can achieve position synchronization; the larger the above parameter K is, the less easily the robot and the virtual object can achieve position synchronization. The larger the parameter K is, in the case where the difference value between the current first resultant force and the current second resultant force is unchanged, the smaller the position in the current position information is, the smaller the degree of position adjustment of the robot and the virtual object is, and the less easily it is to enable the robot and the virtual object to achieve position synchronization; the smaller the parameter K is, the greater the position in the current position information is, the greater the degree of position adjustment of the robot and the virtual object is, and the easier the robot and the virtual object can achieve position synchronization. When the difference value F is large, the parameter K is large, the corresponding position in the current motion information will not be too large, and the degree of the position adjustment of the robot and the virtual object will not be too large so that the robot will not easily generate a large impact on the user; when the difference value F is small, the parameter K is small, and the degree of position adjustment of the robot and the virtual object will not be too small, which is beneficial to realize the position synchronization of the robot and the virtual object.

Alternatively, the physical engine determines the current second resultant force according to the previous motion information corresponding to the previous first resultant force and the previous second resultant force, comprising: obtaining configuration information about a virtual environment; determining a previous virtual driving force of the virtual object according to the previous motion information; determining a previous virtual environment acting force of the virtual object in the virtual environment according to the previous second motion information and configuration information about the virtual object in the virtual environment; and determining the resultant force of the previous virtual driving force and the previous virtual environment acting force as the current second resultant force.

The previous motion information corresponding to the previous first resultant force and the previous second resultant force may be determined by means of the aforementioned corresponding relationship between the force and the motion information. By the above-mentioned solution, the current second resultant force can be obtained.

S203, feed back the current motion information to the physical engine so that the physical engine controls the motion of the virtual object according to the current motion information.

S204, feed back the current motion information to the robot and control the motion of the robot according to the current motion information.

The step of feeding back the current motion information to the robot is no difference in order from the step of feeding back the current motion information to the physical engine.

The current second resultant force of the virtual object is determined by the physical engine according to the previous motion information corresponding to the previous first resultant force of the robot and the previous second resultant force of the virtual object; the current motion information is determined according to the current first resultant force of the robot and the current second resultant force of the virtual object; the current motion information is fed back to the robot and the physical engine so that the robot moves according to the current motion information and the virtual object moves according to the current motion information; in the above-mentioned control process, the transmission sequence of the force and the motion information constitutes one closed loop. According to such a force and motion information transmission sequence, after the sudden change of the virtual environment acting force on the virtual object, the current second resultant force suddenly changes; the current motion information determined according to the current first resultant force and the current second resultant force has the function of synchronously applying a force to the robot and the virtual object, so that after the current second resultant force suddenly changes; in order to synchronously apply a force to the robot and the virtual object, the current motion information may not suddenly change, so that the motion state of the robot may not suddenly change, thereby reducing the impact of the robot on the user, which is beneficial to improving the user safety.

Alternatively, the virtual object motion is controlled according to the current motion information, and the robot motion is controlled according to the current motion information, comprising:

obtaining the current first position of the robot, and the current second position of the virtual object in the virtual environment; determining the sum of the current first position and a position corresponding to the current motion information as the first expected position of the robot, so that the current first position follows the first expected position; and determining the difference between the current second position and the position corresponding to the current motion information as the second expected position of the virtual object, so that the current second position follows the second expected position.

The above-mentioned steps of obtaining the current second position of a virtual object in a virtual environment, determining the difference between the current second position and a position corresponding to the current motion information as the second expected position of the virtual object, and making the current second position follow the second expected position can be executed in a physical engine and can also be executed in a controller of a robot, and is not specifically limited herein.

In the case where the aforementioned difference value F is obtained by subtracting the current first resultant force of the robot from the current second resultant force of the virtual object, the above-described technical solution is adopted.

To make the current first position follow the first expected position, and the current second position follow the second expected position, it can be implemented by using an existing position controller, which will not be described in detail herein.

Or the virtual object motion is controlled according to the current motion information, and the robot motion is controlled according to the current motion information. This may include:

obtaining the current first position of the robot, and the current second position of the virtual object in the virtual environment; determining the difference between the current first position and a position corresponding to the current motion information as the first expected position of the robot, so that the current first position follows the first expected position; and determining the sum of the current second position and the position corresponding to the current motion information as the second expected position of the virtual object, so that the current second position follows the second expected position.

The above-mentioned steps of obtaining the current second position of a virtual object in a virtual environment, determining the sum of the current second position and a position corresponding to the current motion information as the second expected position of the virtual object, and making the current second position follow the second expected position can be executed in a physical engine and can also be executed in a controller of a robot, and is not specifically limited herein.

In the case where the aforementioned positional difference value F is obtained by subtracting the current second resultant force of a virtual engine from the current first resultant force of the robot, the above-described technical solution is adopted.

To make the current first position follow the first expected position, and the current second position follow the second expected position, it can be implemented by using an existing position controller, which will not be described in detail herein.

Alternatively, the virtual object motion is controlled according to the current motion information, and the robot motion is controlled according to the current motion information, comprising: obtaining the current first speed of the robot, and the current second speed of the virtual object in the virtual environment; determining a speed corresponding to the current motion information as the first expected speed of the robot, and making the current first speed follow the first expected speed; and determining the speed corresponding to the current motion information as the second expected speed of the virtual object, and making the current second speed follow the second expected speed.

The above-mentioned steps of obtaining the current second speed of a virtual object in a virtual environment, determining a speed corresponding to the current motion information as the second expected speed of the virtual object, and making the virtual current second speed follow the second expected speed can be executed in a physical engine and can also be executed in a controller of a robot, and is not specifically limited herein.

To make the current first speed follow the first expected speed, and the current second speed follow the second expected speed, it can be implemented by using a speed controller in the prior art, which will not be described in detail herein.

In the case where the speed of the robot and the virtual object is low, and the requirement for the speed synchronization of the robot and the virtual object is low, the above-mentioned technical solution can be used. For example, the virtual scene shown in FIG. 1, where the requirement for the position synchronization of the robot and the virtual object is high, and the requirement for speed synchronization of the robot and the virtual object is low.

Or the virtual object motion is controlled according to the current motion information, and the robot motion is controlled according to the current motion information. This may include:

obtaining the current first speed of the robot, and the current second speed of the virtual object in the virtual environment; determining the sum/difference of the current first speed and the speed corresponding to the current motion information as the first expected speed of the robot, so that the current first speed follows the first expected speed; and determining the difference/sum of the current second speed and the speed corresponding to the current motion information the second expected speed of the virtual object such that the current second speed follows the second expected speed.

The above-mentioned steps of obtaining the current second speed of the virtual object in the virtual environment, determining the difference/sum of the speed corresponding to the current motion information and the current second speed as the second expected speed of the virtual object, and making the current second speed follow the second expected speed can be executed in a physical engine and can also be executed in a controller of a robot, which is not specifically limited herein.

To make the current first speed follow the first expected speed, and the current second speed follow the second expected speed, it can be implemented by using a speed controller in the prior art, which will not be described in detail herein.

In the case where the speeds of the robot and the virtual object are high and the requirement for the speed synchronization of the robot and the virtual object is high, the above technical solution can be used.

In addition, in the case where the above-mentioned difference value F is obtained by subtracting the current second resultant force of the virtual object from the current first resultant force of the robot, the difference between the current first speed and the speed corresponding to the current motion information is determined as the first expected speed, and the current first speed follows the first expected speed; the sum of the current second speed and the speed corresponding to the current motion information is determined as the second expected speed, and the current second speed follows the second expected speed.

In the case where the aforementioned difference value F is obtained by the current second resultant force of the virtual object subtracting the current first resultant force of the robot, the sum of the current first speed and the speed corresponding to the current motion information is determined as the first expected speed, and the current first speed is made to follow the first expected speed; the difference between the current second speed and the speed corresponding to the current motion information is determined as the second expected speed, and the current second speed is made to follow the second expected speed.

In some application scenes, the robot and the virtual object can be controlled according to a position corresponding to the motion information, the robot and the virtual object can also be controlled according to a speed corresponding to the motion information, or the robot and the virtual object can also be controlled according to a position and a speed corresponding to the motion information, for example, using a position controller and a speed controller to control the robot, and using the position controller and the speed controller to control the virtual object.

Of course, the robot and the virtual object can also be controlled according to the acceleration corresponding to the current motion information, for example: obtaining the current first acceleration of the robot, and the current second acceleration of the virtual object in the virtual environment; determining an acceleration corresponding to the current motion information as the first expected acceleration of the robot, and making the current first acceleration follow the first expected acceleration; and determining the acceleration corresponding to the current motion information as the second expected acceleration of the virtual object, and making the current second acceleration follow the second expected acceleration.

Or obtaining the current first acceleration of the robot and the current second acceleration of the virtual object in the virtual environment; determining the sum/difference of the current first acceleration and the acceleration corresponding to the current motion information as the first expected acceleration of the robot so as to make the current first acceleration follow the first expected acceleration; and determining the difference/sum of the current second acceleration and the acceleration corresponding to the current motion information as the second expected acceleration of the virtual object so as to make the current second acceleration follow the second expected acceleration.

The application scenes and application conditions of the acceleration may refer to the application scenes and application conditions of the speed, which will not be described in detail herein.

Figure 3:
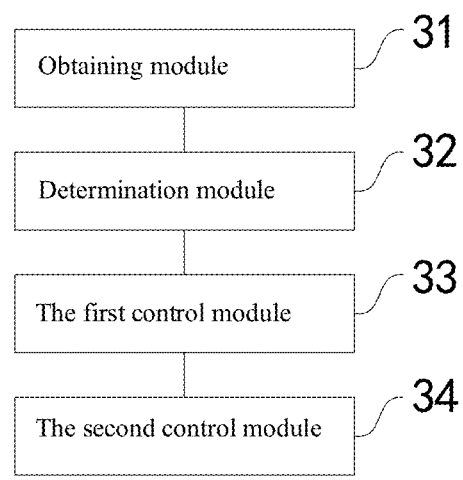
FIG. 3 is a schematic diagram of a robot control device based on a physical engine provided in an embodiment of the present application.

FIG. 3 is a schematic diagram of a robot control device based on a physical engine provided in the embodiment of the present application.

As shown in connection with FIG. 3, the robot control device based on a physical engine comprises: an obtaining module 31, a determination module 32, a first control module 33, and a second control module 34, wherein the obtaining module 31 is configured to obtain the current first resultant force to which the robot is subjected and the current second resultant force to which the virtual object in the virtual environment constructed by the physical engine is subjected;

the determination module 32 is configured to determine the current motion information corresponding to the current first resultant force and the current second resultant force according to the corresponding relationship between the force and the motion information; wherein the current second resultant force is determined by the physical engine according to the previous motion information corresponding to the previous first resultant force of the robot and the previous second resultant force of the virtual object, and the current motion information enables the current first resultant force and the current second resultant force to tend to be synchronized;

the first control module 33 is configured to feed back the current motion information to the physical engine, so that the physical engine controls the motion of the virtual object according to the current motion information;

the second control module 34 is configured to feed back the current motion information to the robot and control the robot motion according to the current motion information.

Alternatively, the corresponding relationship between the force and the motion information comprises:

$$F = M\ddot{x} + B\dot{x} + Kx$$

where F is the difference value between the first resultant force and the second resultant force, x is a position corresponding to the motion information; $\dot{x}$ is a speed corresponding to the motion information; $\ddot{x}$ is an acceleration corresponding to the motion information, M corresponds to an inertia parameter difference value between a real inertia parameter of the robot and a virtual inertia parameter of the virtual object, B corresponds to a damping parameter difference value between a real damping parameter of the robot and a virtual damping parameter of the virtual object, and K is a compensation coefficient for achieving position synchronization between the robot and the virtual object.

Alternatively, the physical engine controls virtual object motion according to the current motion information, comprising: obtaining the current second position of the virtual object in the virtual environment; and determining the difference between the current second position and the position corresponding to the current motion information as the second expected position of the virtual object and making the current second position follow the second expected position.

Alternatively, the second control module comprises a first obtaining unit and a first control unit, the first obtaining unit being configured to obtain the current first position of the robot; the first control unit is configured to determine the sum of the current first position and a position corresponding to the current motion information as the first expected position of the robot and make the current first position follow the first expected position.

Alternatively, the physical engine controls virtual object motion according to the current motion information, comprising: obtaining the current second position of the virtual object in the virtual environment; and determining the sum of the current second position and the position corresponding to the current motion information as the second expected position of the virtual object and making the current second position follow the second expected position.

Alternatively, the second control module comprises a first obtaining unit and a second control unit, the first obtaining unit being configured to obtain the current first position of the robot; the second control unit is configured to determine the difference between the current first position and a position corresponding to the current motion information as the first expected position of the robot and make the current first position follow the first expected position.

Alternatively, the physical engine controls the virtual object motion according to the current motion information, comprising: obtaining the current second speed of the virtual object in the virtual environment, determining a speed corresponding to the current motion information as the second expected speed of the virtual object, and making the current second speed follow the second expected speed.

Alternatively, the second control module comprises a second obtaining unit and a third control unit, wherein the second obtaining unit is configured to obtain the current first speed of the robot; the third control unit is configured to determine a speed corresponding to the current motion information as the first expected speed of the robot and make the current first speed follow the first expected speed.

Alternatively, the physical engine controls the virtual object motion according to the current motion information, comprising: obtaining the current second speed of the virtual object in the virtual environment; determining the difference/sum of a speed corresponding to the current motion information and the current second speed as the second expected speed of the virtual object, and making the current second speed follow the second expected speed.

Alternatively, the second control module comprises a second obtaining unit and a fourth control unit, wherein the second obtaining unit is configured to obtain the current first speed of the robot; the fourth control unit is configured to determine the sum/difference of a speed corresponding to the current motion information and the current first speed as the first expected speed of the robot and make the current first speed follow the first expected speed.

Alternatively, the parameter M is determined in the following manner: obtaining an inertial parameter difference value between a real inertial parameter of a robot and a virtual inertial parameter of a virtual object, and determining the inertial parameter difference value as a parameter M; or obtaining an inertial adjustment parameter positively related to the Kx item, and determining the sum of the inertial parameter difference value and the inertial adjustment parameter as a parameter M; or determining a product of the inertial parameter difference value and the inertial adjustment parameter as a parameter M.

Alternatively, the parameter B is determined in the following manner: obtaining a damping parameter difference value between a real damping parameter of a robot and a virtual damping parameter of a virtual object, and determining the damping parameter difference value as a parameter B; or obtaining a damping adjustment parameter positively related to the Kx item, and determining the sum of the damping parameter difference value and the damping adjustment parameter as a parameter B; or determining the product of the damping parameter difference value and the damping adjustment parameter as a parameter B.

Alternatively, the parameter K is determined in the following manner: obtaining a parameter K that is positively related to the difference value F.

Alternatively, the physical engine determines the current second resultant force according to the previous motion information corresponding to the previous first resultant force and the previous second resultant force, comprising: determining a previous virtual driving force of the virtual object according to the previous motion information; obtaining configuration information about a virtual environment; determining a previous virtual environment acting force of the virtual object in the virtual environment according to the previous second motion information and configuration information about the virtual object in the virtual environment; and determining the resultant force of the previous virtual driving force and the previous virtual environment acting force as the current second resultant force.

In some embodiments, a robot control device based on a physical engine includes a processor and a memory storing a program instruction, the processor being configured to execute the robot control method based on a physical engine provided by the foregoing embodiment when executing the program instruction.

Figure 4:
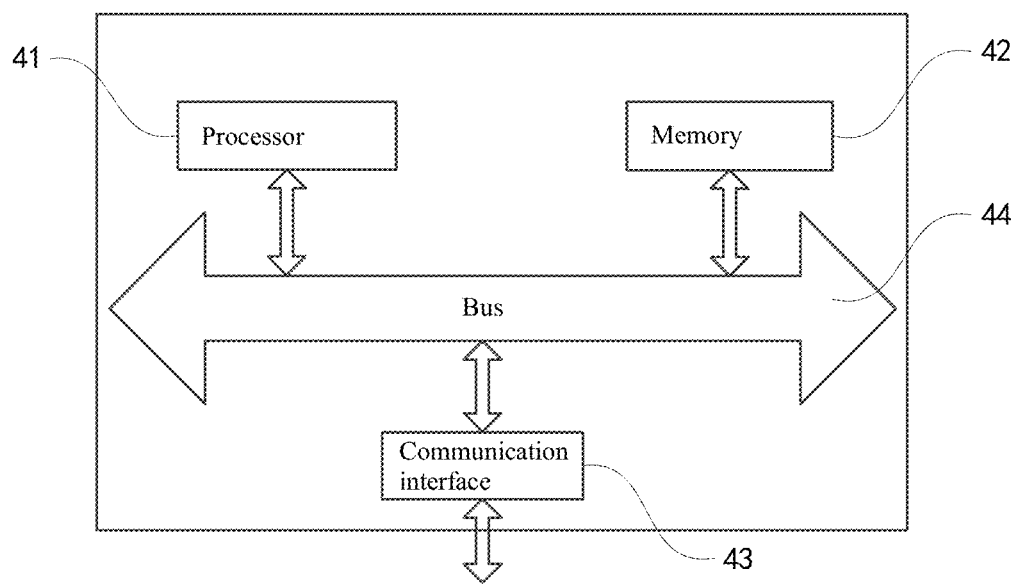
FIG. 4 is a schematic diagram of a robot control device based on a physical engine provided in an embodiment of the present application.

FIG. 4 is a schematic diagram of a robot control device based on a physical engine provided in the embodiment of the present application. As shown in connection with FIG. 4, the robot control device based on a physical engine includes:

a processor 41 and a memory 42. It may further include a communication interface 43 and a bus 44. The processor 41, the communication interface 43, and the memory 42 can communicate with each other through the bus 44. The communication interface 43 may be used for information transmission. The processor 41 may call a logical instruction in memory 42 to execute the robot control method based on a physical engine provided in the foregoing embodiments.

Further, the above-described logic instructions in the memory 42 may be implemented in the form of software functional units and may be stored in one computer-readable storage medium when sold or used as a stand-alone product.

The memory 42 serves as a computer-readable storage medium for storing a software program, a computer-executable program, and program instructions/modules corresponding to the method in the embodiments of the present application. The processor 41 executes functional applications and data processing by operating software programs, instructions and modules stored in the memory 42, i. e. it implements the method in the above-described method embodiment.

The memory 42 may include a program storage area and a data storage area, wherein the program storage area may store an application program required by an operating system and at least one function; the data storage area may store data and the like created according to the use of the terminal equipment. In addition, the memory 42 may include high-speed random access memory and may also include non-volatile memory.

In some embodiments, a rehabilitation robot includes the robot control device based on a physical engine provided in the foregoing embodiments.

An embodiment of the present application provides a computer-readable storage medium that stores a computer-executable instruction set to execute the robot control method based on a physical engine provided in the foregoing embodiments.

An embodiment of the application provides a computer program product including a computer program stored on a computer-readable storage medium. The computer program includes a program instruction which, when executed by a computer, causes the computer to execute the robot control method based on a physical engine provided in the foregoing embodiments.

The computer-readable storage medium may be a transitory computer-readable storage medium or a non-transitory computer-readable storage medium.

Technical solutions of the embodiments of the present application may be embodied in the form of a software product. The computer software product is stored in one storage medium and includes one or more than one instructions for causing one computer equipment (which may be a personal computer, a server, or network equipment, etc.) to execute all or part of the steps of the method in the embodiments of the present application. However, the above-mentioned storage medium can be a non-transitory storage medium, including: various media which can store program codes, such as U disk, mobile hard disk, read-only memory (ROM), random access memory (RAM), magnetic disk or optical disk, etc., and can also be transitory storage media.

The foregoing description and drawings sufficiently illustrate embodiments of the present application to enable those skilled in the art to practice them. Other embodiments may include structural, logical, electrical, procedural, and other changes. The embodiments merely represent possible changes. Individual components and functions are optional unless explicitly required otherwise, and the sequence of operations may change. Portions and features of some embodiments may be included in or substituted for those of other embodiments. Furthermore, the words used herein are used for describing embodiments only and are not intended to limit the claims. As used in the description of the embodiments and the claims, the singular forms "a", "an", and "the" are intended to include the plural forms as well, unless the context clearly indicates otherwise. In addition, the terms "comprise", a variation thereof "comprises", and/or "comprising", etc. when used in this application, specify the presence of stated features, entireties, steps, operations, elements, and/or assemblies, but do not preclude the presence or addition of one or more other features, entireties, steps, operations, elements, assemblies, and/or groups thereof. An element defined by the phrase "including one" does not, without more constraints, preclude the existence of additional identical elements in the procedure, method, or equipment that includes the element. Each embodiment herein may focus on the differences from other embodiments, and the same or similar parts between the various embodiments can be referred to each other. For methods, products, etc. disclosed in the embodiments, if they correspond to the method part disclosed in the embodiments, for related details, reference is made to the description of the method part.

Those skilled in the art would recognize that the units and algorithm steps of the examples described in combination with the embodiments disclosed herein can be implemented by electronic hardware or a combination of computer software and electronic hardware. Whether such functionality is executed as hardware or software depends upon the particular application and design constraints of the technical solution. The technicians may use different methods for each specific application to realize the described functions, but such realization should not be considered as going beyond the scope of the embodiments of the present application. Those skilled in the art can clearly understand that, for the convenience and conciseness of the description, the specific working procedure of the system, apparatus, and unit described above can refer to the corresponding procedure in the foregoing method embodiment, which will not be repeated here.

In the embodiments disclosed herein, the disclosed method and product (including but not limited to the apparatus, equipment, etc.), may be implemented in other ways. For example, the apparatus embodiments described above are merely illustrative. For example, the division of the units may only be a logical function division, and there may be other division modes in actual implementation. For example, multiple units or assemblies may be combined or integrated into another system, or some features can be ignored or not executed. Additionally, the couplings or direct couplings or communication connections shown or discussed with respect to each other may be indirect couplings or communication connections through some interfaces, apparatuses, or units, and may be electrical, mechanical, or otherwise. The units described as separate components may or may not be physically separated, and the components displayed as units may or may not be physical units, that is, they may be located in one place, or they may be distributed on multiple network units. Some or all of the units may be selected according to actual needs to implement the embodiments. In addition, each functional unit in the embodiments of the present application may be integrated in one processing unit, or each unit may exist alone physically, or two or more units may be integrated into one unit.

The flowcharts and block diagrams in the accompanying drawings show the possible implementation of system structure, functions, and operations of the system, method, and computer program product according to the embodiments of the present application. In this regard, each block in the flowcharts or block diagrams may represent one module, a program segment, or a part of the code, which includes one or more than one executable instructions for implementing the specified logical function. In some alternative implementations, the functions noted in the blocks may also occur out of the order noted in the drawings. For example, two successive blocks may in fact be executed substantially in parallel, or they may sometimes be executed in the reverse order, depending on the functionality involved. Each block in the block diagrams and/or flowcharts, and the combination of the blocks in the block diagrams and/or flowcharts, can be implemented by a dedicated hardware-based system that executes the specified function or action, or can be implemented by a combination of dedicated hardware and computer instructions.

What is claimed is:

1. A robot control method based on a physical engine, comprising:

obtaining a current first resultant force to which a robot is subjected and a current second resultant force to which a virtual object in a virtual environment constructed by a physical engine is subjected;

determining current motion information corresponding to the current first resultant force and the current second resultant force according to a corresponding relationship between a force and motion information; wherein the current second resultant force is determined by the physical engine according to previous motion information corresponding to a previous first resultant force of the robot and a previous second resultant force of the virtual object, and the current motion information enables the current first resultant force and the current second resultant force to tend to be synchronized, wherein the corresponding relationship between a force and motion information comprises:

$F = M\ddot{x} + B\dot{x} + Kx$ where F is a difference value between a first resultant force and a second resultant force, x is a position corresponding to the motion information; $\dot{x}$ is a speed corresponding to the motion information; $\ddot{x}$ is an acceleration corresponding to the motion information, M corresponds to an inertia parameter difference value between a real inertia parameter of the robot and a virtual inertia parameter of the virtual object, B corresponds to a damping parameter difference value between a real damping parameter of the robot and a virtual damping parameter of the virtual object, and K is a compensation coefficient for achieving position synchronization between the robot and the virtual object;

feeding back the current motion information to the physical engine, so that the physical engine controls a motion of the virtual object according to the current motion information; and feeding back the current motion information to the robot and controlling the motion of the robot according to the current motion information.

2. The robot control method according to claim 1, wherein virtual object motion is controlled according to the current motion information, and the motion of the robot is controlled according to the current motion information, comprising:

obtaining a current first position of the robot, and a current second position of the virtual object in the virtual environment; determining a sum of the current first position and a position corresponding to the current motion information as a first expected position of the robot and making the current first position follow the first expected position; and determining a difference between the current second position and the position corresponding to the current motion information as a second expected position of the virtual object, and making the current second position follow the second expected position;

or, obtaining the current first position of the robot, and the current second position of the virtual object in the virtual environment; determining the difference between the current first position and the position corresponding to the current motion information as the first expected position of the robot and making the current first position follow the first expected position; and determining the sum of the current second position and the position corresponding to the current motion information as the second expected position of the virtual object, and making the current second position follow the second expected position.

3. The robot control method according to claim 1, wherein virtual object motion is controlled according to the current motion information, and the motion of the robot is controlled according to the current motion information, comprising:
obtaining a current first speed of the robot, and a current second speed of the virtual object in the virtual environment; determining a speed corresponding to the current motion information as a first expected speed of the robot and making the current first speed follow the first expected speed; and determining the speed corresponding to the current motion information as a second expected speed of the virtual object, and making the current second speed follow the second expected speed;
or,
obtaining the current first speed of the robot, and the current second speed of the virtual object in the virtual environment; determining a sum/difference between the speed corresponding to the current motion information and the current first speed as the first expected speed of the robot, and making the current first speed follow the first expected speed; and determining the difference/sum of the speed corresponding to the current motion information and the current second speed as the second expected speed of the virtual object and making the current second speed follow the second expected speed.

4. The robot control method according to claim 1, wherein
a parameter M is determined in a following manner:
obtaining the inertial parameter difference value between the real inertial parameter of the robot and the virtual inertial parameter of the virtual object, and determining the inertial parameter difference value as the parameter M; or obtaining an inertial adjustment parameter positively related to Kx item, and determining a sum of the inertial parameter difference value and the inertial adjustment parameter as the parameter M; or determining a product of the inertial parameter difference value and the inertial adjustment parameter as the parameter M;
and/or,
the parameter B is determined in the following manner:
obtaining the damping parameter difference value between the real damping parameter of the robot and the virtual damping parameter of the virtual object, and determining the damping parameter difference value as the parameter B; or obtaining a damping adjustment parameter positively related to Kx item, and determining the sum of the damping parameter difference value and the damping adjustment parameter as the parameter B; or determining the product of the damping parameter difference value and the damping adjustment parameter as the parameter B.

5. The robot control method according to claim 1, wherein the parameter K is determined in the following manner:
obtaining the parameter K that is positively correspond to the difference value F.

6. The robot control method according to claim 1, wherein the physical engine determines the current second resultant force according to the previous motion information corresponding to the previous first resultant force and the previous second resultant force, comprising:

determining a previous virtual driving force of the virtual object according to the previous motion information;
obtaining configuration information about the virtual environment;
determining a previous virtual environment acting force of the virtual object in the virtual environment according to previous second motion information and configuration information about the virtual object in the virtual environment; and
determining a resultant force of the previous virtual driving force and the previous virtual environment acting force as the current second resultant force.

7. A robot control device based on a physical engine, comprising:
an obtaining processor configured to obtain a current first resultant force to which a robot is subjected and a current second resultant force to which a virtual object in a virtual environment constructed by the physical engine is subjected;
a determination processor configured to determine current motion information corresponding to the current first resultant force and the current second resultant force according to a corresponding relationship between a force and motion information; wherein the current second resultant force is determined by the physical engine according to previous motion information corresponding to a previous first resultant force of the robot and a previous second resultant force of the virtual object, and the current motion information enables the current first resultant force and the current second resultant force to tend to be synchronized,
wherein the corresponding relationship between a force and motion information comprises:

$F=M\ddot{x}+B\dot{x}+Kx$ where F is a difference value between a first resultant force and a second resultant force, x is a position corresponding to the motion information; $\dot{x}$ is a speed corresponding to the motion information; $\ddot{x}$ is an acceleration corresponding to the motion information, M corresponds to an inertia parameter difference value between a real inertia parameter of the robot and a virtual inertia parameter of the virtual object, B corresponds to a damping parameter difference value between a real damping parameter of the robot and a virtual damping parameter of the virtual object, and K is a compensation coefficient for achieving position synchronization between the robot and the virtual object;
a first control processor configured to feed back the current motion information to the physical engine, so that the physical engine controls a motion of the virtual object according to the current motion information; and
a second control processor configured to feed back the current motion information to the robot and control the motion of the robot according to the current motion information.

8. A robot control device based on a physical engine, comprising a processor and a memory storing a program instruction, wherein the processor is configured to execute the robot control method based on a physical engine according to claim 1 when executing the program instruction.

9. A rehabilitation robot, comprising the robot control device based on a physical engine according to claim 7.

* * * * *